United States Patent [19]
Ja

[11] Patent Number: 5,966,363
[45] Date of Patent: Oct. 12, 1999

[54] OPTICAL AND MAGNETO-OPTIC DATA STORAGE SYSTEMS UTILIZING TRANSMISSIVE MEDIA

[75] Inventor: Yu-Hong Ja, San Jose, Calif.

[73] Assignee: Read Rite Corporation, Milpitas, Calif.

[21] Appl. No.: 08/779,461

[22] Filed: Jan. 7, 1997

[51] Int. Cl.$^6$ ...................................................... G11B 7/00
[52] U.S. Cl. ............................................ 369/112; 369/14
[58] Field of Search .............................. 369/13, 14, 112, 369/32, 48, 47, 54, 198, 199

[56] References Cited

U.S. PATENT DOCUMENTS

| | | | |
|---|---|---|---|
| 4,750,152 | 6/1988 | Yonekubo et al. | 369/13 |
| 4,926,403 | 5/1990 | Tsuyuguchi et al. | 369/112 |
| 4,926,409 | 5/1990 | Tsuyuguchi et al. | 369/112 |
| 5,255,262 | 10/1993 | Best et al. | |

OTHER PUBLICATIONS

"Optical Beam Deflection Using Dynamic Volume Reflection Gratings" in Optical and Quantum Electronics 21 (1989), pp. 151–154.

"Scanning Beam Collimation Method for Measuring Dynamic Angle Variations Using an Acousto–Optic Deflector", Lijiang Zeng, et al., 1662 Opt. Eng. 35(2) 1662–1663 (Jun. 1996).

"Volume Holographic Memory Systems: Techniques and Architectures", Optical Engineering, Aug. 1995, vol. 34, No. 8, pp. 2193–2203.

G.T. Sincerbox and G. Rosen, "Opto–Optical Light Deflection", Applied Optics, vol. 22, No. 5, (Mar. 1983), pp. 690–697.

J.P. Herriau, A. Delboulbe, J.P. Huignard, G. Rosen, and G. Pauliat, "Optical–Beam Steering for Fiber Array Using Dynamic Holography", IEEE Journal of Lightwave Technology, vol. LT–4, No. 7, (Jul. 1986) pp. 905–907.

*Primary Examiner*—Tan Dinh
*Attorney, Agent, or Firm*—Robert King; Samuel Kassatly

[57] ABSTRACT

An optical data storage system utilize a fully or partially transmissive data storage medium or disk. The optical system includes a platform capable of moving either radially or pivotally relative to the disk. A head has a first and a second optical arms secured to the platform. One optical arm is positioned below the storage medium, and the other optical arm is positioned above the storage medium. One of the two optical arms includes a light source connected to the platform for generating a collimated light beam, and a first reflective mirror distally connected to the platform for reflecting the collimated light beam toward the storage medium. The other optical arm includes a photo-detector connected to the platform, and a second reflective mirror distally connected to the platform for reflecting the light beam impinging upon it to the photo-detector. In one embodiment the light source is disposed below the disk while in another embodiment the light source is disposed above the disk. The optical system may also be used as a magneto-optic system capable of recording data onto the disk by the addition of a magnet secured to at least one of the reflective mirrors. The magnet is cylindrically shaped and hollow along its axial length, and allows the laser beam reflected by the mirror to pass though and along its axial length. In yet another embodiment the laser source includes a reading laser source with a weaker light intensity for reading the recorded data onto the storage medium, and a recording laser source with a higher light intensity for recording data onto the storage medium.

25 Claims, 5 Drawing Sheets

FIG. 8

OPTICAL AND MAGNETO-OPTIC DATA STORAGE SYSTEMS UTILIZING TRANSMISSIVE MEDIA

CROSS REFERENCE TO RELATED APPLICATIONS

The present patent application relates to the following patent applications by the same applicant herein, all of which applications are assigned to the same assignee, and incorporated herein by reference:

Stationary Optical Head Using Holographic or Acousto-Optical Deflection Ser. No. 08/0779,462, filed on Jan. 7, 1997.

Stationary Optical Data Storage System Using Holographic or Acousto-Optical Deflection Ser. No. 08/779,463, filed Jan. 7, 1997.

Transmissive Optical And Magneto-Optical Data Storage Media Ser. No. 08/779,394, filed on Jan. 7, 1997.

BACKGROUND OF THE INVENTION

1. Field of the Invention

This invention relates generally to optical and magneto-optic data storage systems, and in particular to optical and magneto-optic storage systems utilizing a fully or partially transmissive data storage medium.

2. Description of Related Art

Optical and magneto-optic data storage systems store great quantities of data on a disk. The data is accessed by focusing a laser beam onto the disk and detecting the reflected light beam. Three kinds of systems are well known. The first kind is a ROM (Read Only Memory) system in which data is permanently embedded as marks in the disk. The data is detected as a change in reflectivity as the laser beam impinges on the data marks.

The second kind is a WORM (Write-Once-Read-Many) system that allows the user to write data by making marks, such as pits, on a blank optical disk surface. Once the data is recorded onto the disk it cannot be erased. The data in a WORM system is also detected as a change in reflectivity.

The third kind is a WREM (Write-Read-Erase-Many) system in which a laser beam is used to heat a magneto-optic data layer to a critical temperature, generally just below the Curie temperature, in order to write and erase the data. As the critical temperature is reached, the magnetic domain field strength is reduced to close to zero. An external magnetic field, using an electromagnet or a permanent magnet, is then used to reverse the domain to record a one or a zero. In general data is recorded by orienting the magnetic domain of a spot in either an up or a down position. The WREM system reads the recorded data by directing a low power (reading) laser beam to the data layer. The difference in magnetic domain directions causes the plane of polarization of the light beam to be rotated one way or the other, clockwise or counterclockwise. This change in orientation of polarization is then detected and recognized as either a digit "1" or "0".

U.S. Pat. No. 5,255,262 to Best et al., titled "Multiple Data Surface Optical Data Storage System With Transmissive Data Surfaces", issued on Oct. 19, 1993, which is incorporated herein by reference, describes an optical data storage system that includes a multiple data surface medium and an optical head. The medium includes several substrates that are separated by a light transmissive medium. With the exception of the last data layer, data surfaces are substantially light transmissive and are located on the substrate surfaces which lie adjacent to a light transmissive medium. The optical head includes an aberration compensator to allow the head to focus onto the different data surfaces, and a filter to screen out unwanted reflected light.

This patented system is relatively complicated and its manufacture is labor intensive. Also, the system uses a focusing mechanism, which adds complexity and cost, and reduces the system signal to noise ratio.

Therefore, there is still a greatly unsatisfied need for an optical system and a magneto-optic data storage system with a reduced number of components, thus simplifying the overall structure and reducing its cost.

SUMMARY OF THE INVENTION

In a preferred embodiment of the present invention, an optical data storage system utilizes a fully or partially transmissive data storage medium or disk. The optical system includes a platform capable of moving either radially or pivotally relative to the disk. A head has a first and a second optical arms secured to the platform. One optical arm is positioned below the storage medium, and the other optical arm is positioned above the storage medium. One of the two optical arms includes a light source connected to the platform for generating a collimated light beam, and a first reflective mirror distally connected to the platform for reflecting the collimated light beam toward the storage medium. The other optical arm includes a photo-detector connected to the platform, and a second reflective mirror distally connected to the platform for reflecting the light beam impinging upon it to the photo-detector. In one embodiment the light source is disposed below the disk while in another embodiment the light source is disposed above the disk.

The optical system may also be used as a magneto-optic system capable of recording data onto the disk by the addition of a magnet secured to one of the reflective mirrors. The magnet is cylindrically shaped and hollow along its axial length and allows the laser beam reflected by the first mirror to pass though and along its axial length.

In still another embodiment the laser source includes a reading laser source with a weaker light intensity, for reading the recorded data onto the storage medium, and a recording laser source with a higher light intensity for recording data onto the storage medium.

BRIEF DESCRIPTION OF THE DRAWINGS

The features of the present invention and the manner of attaining them, will become apparent, and the invention itself will be understood by reference to the following description and the accompanying drawings, wherein.

Similar numerals refer to similar elements in the drawings. It should be understood that the sizes of the different components in the figures may not be in exact proportion, and are shown for visual clarity and for the purpose of explanation.

DETAILED DESCRIPTION OF THE INVENTION

Figure 1:
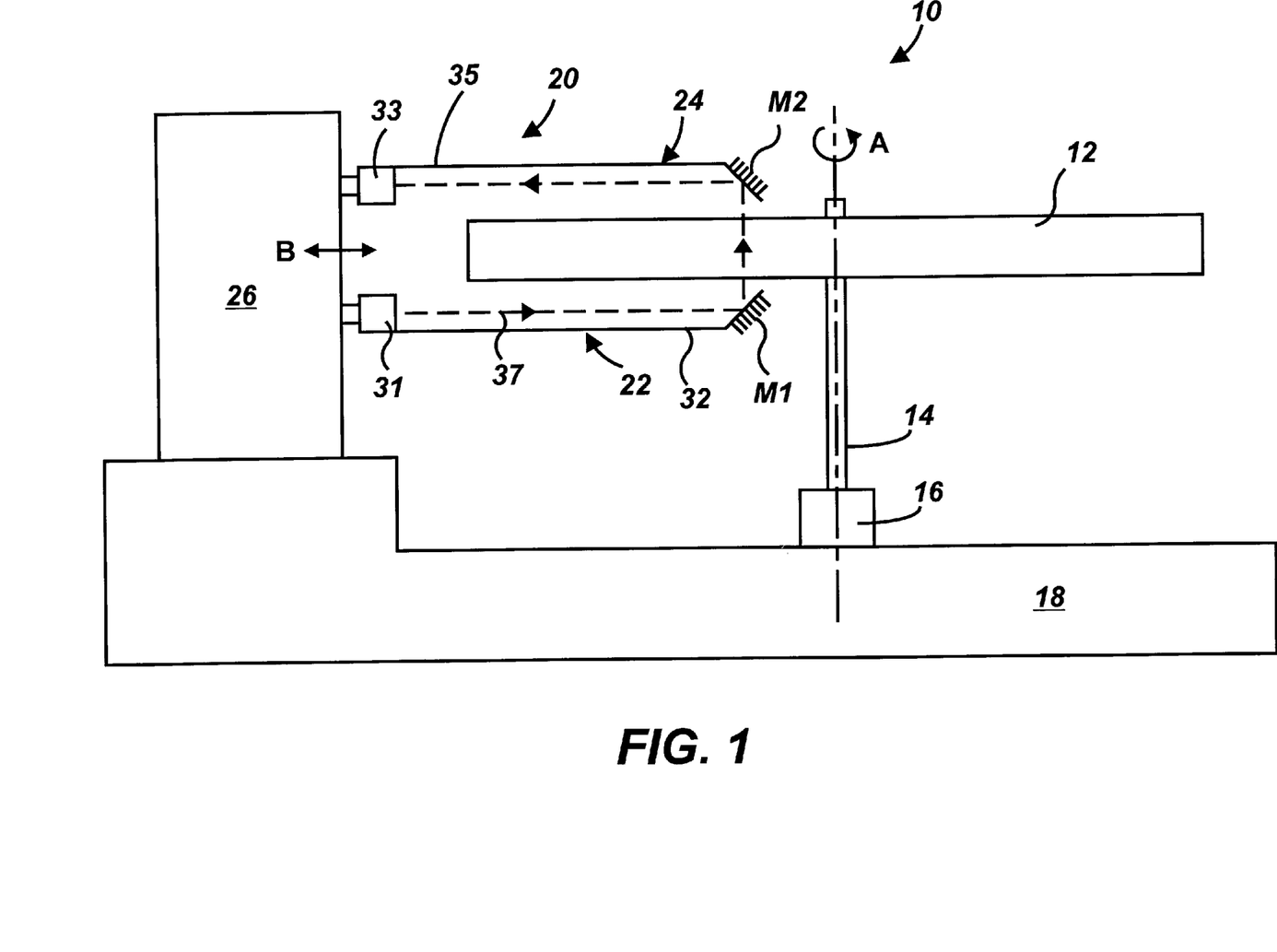
FIG. 1 is a schematic diagram of an optical system according to the present invention.

FIG. 1 is a schematic view of an optical data storage system 10 according to the present invention. The system 10 includes an optical data storage medium such as a CD ROM, a WORM, or a WREM disk 12. An important characteristic of the disk 12 is that it is partly or completely optically transmissive for allowing a laser or light beam to pass through. The disk 12 is removably mounted on a spindle 14. The spindle 14 is rotatably secured to a motor 16 which, in turn, is secured to a chassis 18. The motor 16 rotates the spindle 14 as well as the disk 12 around an axis in the direction of the arrow A.

The system 10 further includes an optical head 20 composed of two optical arms 22, 24 secured to a platform 26 which is movably mounted on the chassis 18. The first optical arm 22 is positioned below the disk 12, and the second optical arm 24 is positioned above the disk 12, in registration with the first optical arm 22. It should be understood that in another embodiment the positions of the optical arms 22, 24 relative to the disk 12 may be reversed.

The first optical arm 22 is formed of a light source 31 such as a laser source, which is distally connected to a first reflective mirror M1 via a link 32. The second optical arm 24 is formed of a second reflective mirror M2 which is distally connected to a photo-detector 33 via a link 35. The mirrors M1 and M2 are capable of traveling between an innermost track referred to as the inner diameter (ID) track, and an outermost track referred to as the outer diameter (OD) track.

In operation, the optical head 20 moves radially, i.e., linear actuation, relative to the disk 12, in the direction of the arrow B. It should be clear to a person skilled in the art that the optical head 20 may alternatively be moved pivotally, i.e., rotary actuation. The laser source 31 generates a light or laser beam 37 substantially parallel to the surface of the disk 12. The laser beam 37 impinges upon the first mirror M1 and is reflected thereby toward the disk 12.

Figure 2:
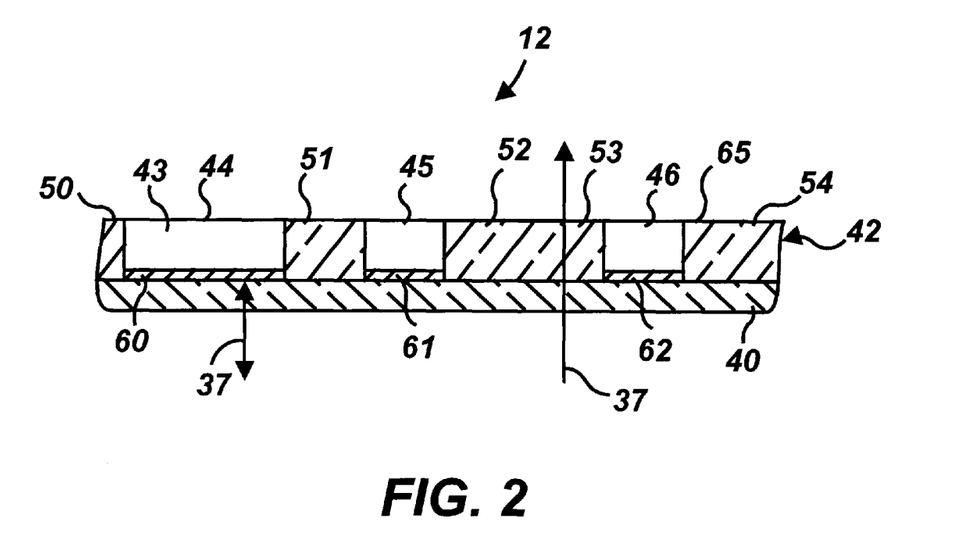
FIG. 2 is a partial cross-sectional view of an optical data storage medium according to the present invention, for use with the optical system of FIG. 1.

As further illustrated in FIG. 2 the laser beam 37 either passes through the transmissive disk 12, where it impinges on a transparent region of the disk 12, for indicating a digit "1". The laser beam 37 is diffracted (or reflected) by the disk 12 where it impinges on a diffractive (or reflective) layer or region, for indicating a digit "0". When the laser beam 37 passes through the disk 12 it is captured by the second mirror M2 and reflected thereby to the photo-detector 33 for processing.

The optical system 10 offers several advantages over existing systems. For instance, the optical system 10 eliminates the requirement for a focusing mechanism, thus reducing the number of components, simplifying the system manufacture and operation and improving its performance, and reducing its overall cost. In addition, the optical medium or disk 12 is simpler and less expensive to produce.

FIG. 2 is a cross-sectional view of the optical data storage medium or disk 12 according to the present invention. The disk 12 includes a substrate 40 which is transmissive either fully or partly to the laser beam 37 (FIG. 1). The substrate 40 provides mechanical support to the disk 12, and is generally deposited where the laser beam 37 enters the disk 12. The substrate 40 may be made of glass, polycarbonate or another suitable polymer material. In one embodiment the thickness of the substrate 40 ranges between 1 mm and 2 mm.

A data substrate 42 is then formed, deposited on, or bonded to the substrate 40. The data substrate 42 is preferably fully transmissive to the laser beam 37, but may also be partially transmissive. The data substrate 42 may be of the same material as the substrate 40. In one embodiment the substrate 40 and the data substrate 42 form a single integral layer. The partial transmissiveness of the data substrate 42 may be preferred for cost reason.

The data substrate 42 is patterned to form block regions, e.g., 43, 44, 45, 46 and pass regions, e.g., 50, 51, 52, 53, 54. The block regions do not allow the light beam to pass through. For instance block region 44 is shown as blocking light beam 37 from passing through the data substrate 42 by reflecting it. The pass regions on the other hand provide an optical path for the light beam 37 through the data substrate 42.

The blockage, or the passage of the light beam 37 through the disk 12, indicate the type of binary digit "1" or "0" recorded or stored on the disk 12. For instance, in one embodiment the block region indicates that the digit "0" has been recorded, while the pass region indicates that the digit "1" has been recorded. In another embodiment the block region indicates that the digit "1" has been recorded, while the pass region indicates that the digit "0" has been recorded.

Figure 3:
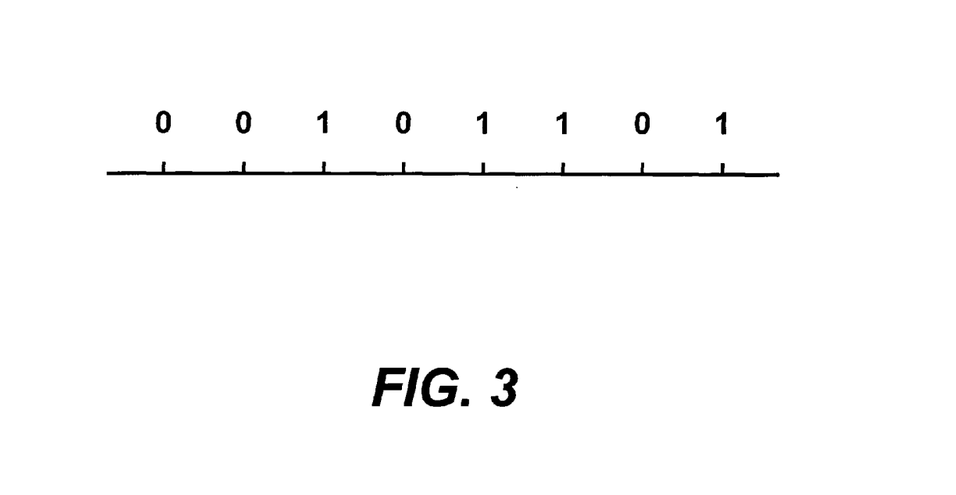
FIG. 3 represents a data pattern corresponding to block and pass regions forming part of the optical medium of FIG. 2.

FIG. 3 represents a data pattern corresponding to the block and pass regions of FIG. 2. Starting at block regions 43, 44, the data pattern indicates that two consecutive "0" digits are recorded on the disk 12. Pass region 51 shows a "1"; block region 45 reflects a "0"; the two consecutive pass regions 52, 53 indicate two consecutive digits "1"; block region 46 indicates a "0"; and pass region 54 indicates a "1". The length of a region block and that of a pass region are substantially similar, and are generally representative of a single bit of data.

In a preferred embodiment after the data substrate 42 is deposited on, and bonded to the substrate 40 the block regions are formed by etching away part of the substrate 42 to form corresponding wells. The wells may be hollow or filled with an appropriate material, and may be formed by means of well known techniques such as photo-etching, or techniques to be developed in the future. While FIG. 2 shows that the block regions are etched throughout the entire depth of the data substrate 42, it should be understood that the block regions may be etched to a predetermined depth that is less than the entire depth of the data substrate 42. In addition, while FIG. 2 shows that all the wells of the block regions have a similar depth, it should be clear that in a different embodiment the wells of the block regions may have varying depths across the surface of the disk 12.

After the wells are formed, their bottom surfaces are coated with reflective coatings, e.g., 60, 61, 62. These reflective coatings 60, 61, 62 may be made of any suitable reflective material such as aluminum metal with a thickness of approximately 50 nm. In the embodiment of FIG. 2 the upper surface 65 of the data substrate is not protected by a protective layer. In an alternative embodiment a protective layer (not shown) may be formed over the upper surface 65. The reflective coatings may be smooth to reflect the laser beam 37, or they may have roughened incident surfaces in order to diffract the laser beam 37.

Figure 4:
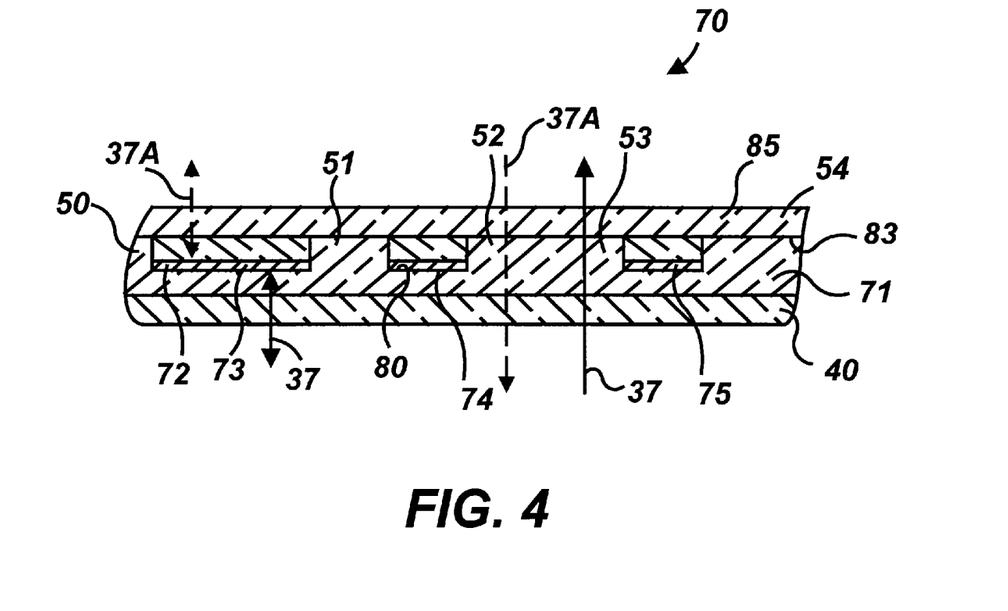
FIG. 4 is a partial cross-sectional view of another optical data storage medium according to the present invention, for use with the optical system of FIG. 1.

FIG. 4 is a cross-sectional view of an alternative embodiment for an optical data storage medium or disk 70 according to the present invention, for use with the optical system 10 of FIG. 1. The disk 70 is similar to the disk 12 and includes a substrate 40 on which a data substrate 71 with a plurality of pass regions 50–54 are formed. The data substrate 71 may be made from the same material as the substrate 40. The data substrate 71 further includes a plurality of block regions, e.g., 72, 73, 74, 75, that are patterned to reflect or diffract the stored data.

Figure 5:
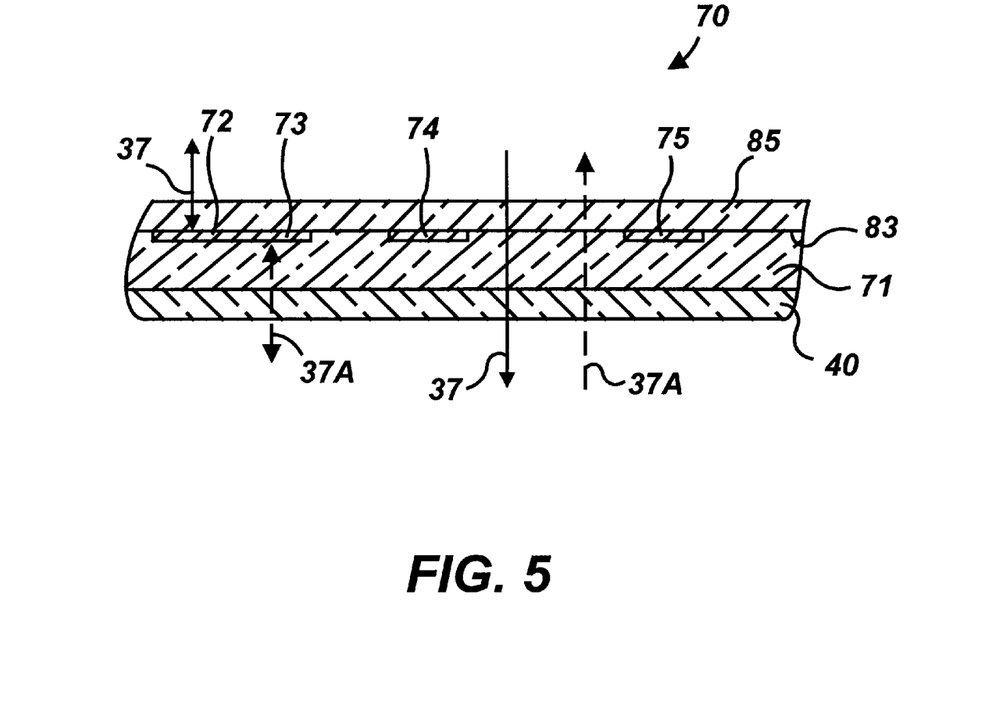
FIG. 5 is a partial cross-sectional view of yet another optical data storage medium according to the present invention, for use with the optical system of FIG. 1.

In this disk 70 the depth of some or all the block regions do not extend all the way through the data substrate 71. In a preferred embodiment each block region, for instance block region 74, is formed by depositing a reflective layer 80 at the bottom of the well, in proximity to the geometric center plane of the data substrate 71. It should however be understood that in other embodiments the reflective layer 80 may be formed at any depth of the data substrate 71. As illustrated in FIG. 5, the reflective layers 72–75 may be formed in proximity to the upper surface 83 of the disk 70. A combined design of the various depth positioning of the reflective layers 72–75 is also possible.

An optional but desirable protective layer 85 is deposited on top of the upper surface 83. This will enable the data stored on the disk 70 to be read from either side of the disk 70. The solid lines indicative of the laser beam 37 illustrate that the laser beam 37 can be incident from above the disk 70 to read the data. The dashed lines indicative of the laser beam 37A illustrate that the laser beam 37A can alternatively be incident from underneath the disk 70.

In a preferred embodiment the optical disk 12 is between 1 mm to 1.2 mm thick. It should be understood that other embodiments of the optical system 10 may employ optical disks 12 of other thicknesses.

Referring now to FIG. 1, the optical system 10 further includes a tracking control mechanism (not shown), which may utilize existing technology, such as a push-pull photodetector. The laser source 31 irradiates a fine collimated beam preferably with a wavelength of less than 0.6 micron to 0.7 micron, and a beam diameter of approximately 1 micron. Such a beam can be generated for instance by a soliton laser; a laser source using a self focusing medium or a non-linear optical medium such as a photo refractive crystal; or any other suitable light source that emits a fine collimated beam.

The two mirrors M1 and M2 are reflective. An advantage of the present invention is that the reflectivity of the mirrors M1 and M2 is not critical since the difference in the reading intensities of the digits "1" and "0" is significant. In other terms, as described above relative to FIGS. 2 and 3 the intensity of the light indicative of the digit "1" is substantially close to the intensity of the laser beam 37 which is transmitted through the disk 12 with no or minimal attenuation. On the other hand, the intensity of the light indicative of the digit "0" is zero or substantially zero since the laser beam 37 is blocked by the block regions. Thus the difference in the reading intensities of the digits "1" and "0" is substantially equal to the intensity of the laser beam 37 and is therefore significantly higher than the difference in the reading intensities realized by existing optical systems.

In one embodiment the reflectivity of the mirrors M1 and M2 can be 95 percent. Such tolerance in the reflectivity of the mirrors M1 and M2 allows for a greater tolerance in the design of the optical system 10, thus contributing to a reduction in the components and manufacturing cost.

Mirrors M1 and M2 may have any desirable shape. In one embodiment mirrors M1 and M2 are identical and have a surface area of approximately 1 mm$^2$. The distance between the centers of mirrors M1 and M2 depends on the thickness of the optical disk 12. Such distance is not critical since the present optical system 10 does not utilize a focused beam but rather a collimated beam. The laser beam 37 travels parallel to the disk surface at a height ranging from about 0.2 mm to 1.0 mm therefrom.

In a preferred embodiment the mirrors M1 and M2 are disposed symmetrically relative to the disk 12. Mirror M1 is positioned at an angle of +45 degrees relative to the surface of the disk 12, while mirror M2 is positioned at an angle of −45 degrees relative to the disk surface. In this embodiment the laser beam 37 can travel normally to the disk surface.

In another embodiment the mirrors M1 and M2 can be physically connected together to be moved independently from the laser source 31 and the photo-detector 33. In such a design, the mirrors M1 and M2 can be moved radially without much concern about alignment, since the light beam travels parallel to the surface of the disk 12.

In still another embodiment mirror M1 is positioned at an angle "α" relative to the disk surface, and mirror M2 is positioned at an angle "β" relative to the disk surface, such that:

$$\beta = -(90° - \alpha).$$

In this alternative embodiment the mirrors M1 and M2 are not disposed in registration relative to each other, i.e., symmetrically with respect to the disk surface. Mirrors M1 and M2 are offset such that the laser beam 37 reflected by mirror M1 is captured by mirror M2 and travels parallel to the disk surface.

In yet another embodiment the mirrors M1 and M2 are rotatable and their angular dispositions relative to the disk surface remain complementary. In addition the first and second optical arms 22, 24 can move independently of each other, such that the distance between the mirrors M1 and M2 varies in order for the laser beam 37 reflected by mirror M2 to travel along a path parallel to the disk surface.

Figure 6:
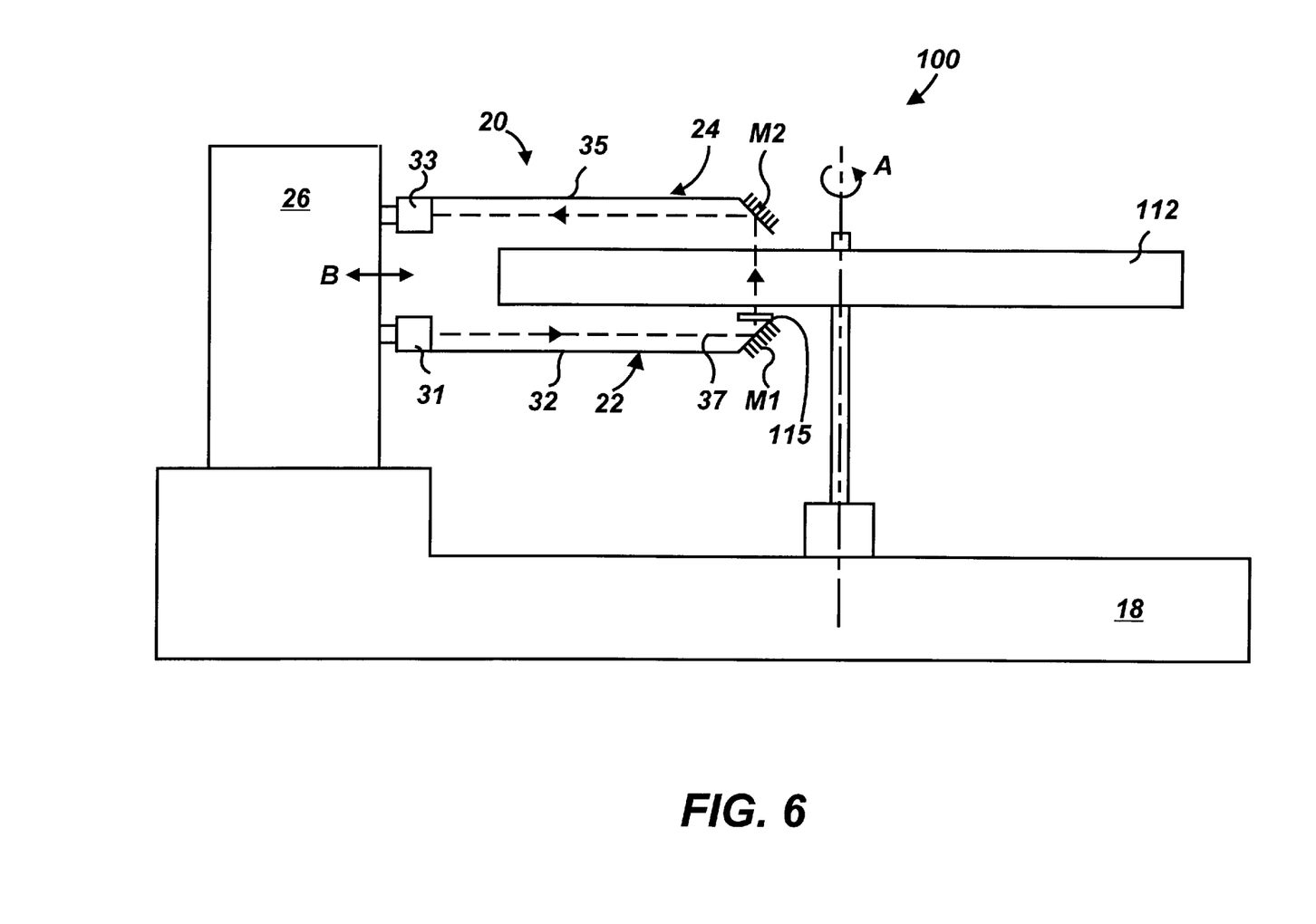
FIG. 6 is a schematic diagram of a magneto-optic system according to the present invention.

With reference to FIG. 6, it illustrates a magneto-optic system 100 according to the present invention. The system 100 uses a similar basic design to that of the system 10 (FIG. 1) and includes several similar components. The operation of the system 100 is relatively similar to that of the system 10 and is further capable of writing data onto a magneto-optic disk 112.

The system 100 includes a magnet 115, such as an electromagnet or a permanent magnet, for writing data onto the disk 112. The magnet 115 is cylindrically shaped, and is hollow along its axial length for allowing a light beam to pass through the magnet 115. The magnet 115 is secured to one end of mirror M1 such that the laser beam 37 reflected by mirror M1 passes through the hollow center of the magnet 115. The magnet 115 does not have a significant effect when the system 100 reads data already recorded on the disk 112. When the system 100 is in the process or reading data it functions in the same manner as described above in relation to system 10.

When it is desired to write onto the disk 112, the laser source 31 increases the intensity of the laser beam sufficiently so that it heats a magneto-optic data substrate 154 (FIG. 7) of the disk 112 to a critical temperature, around its Curie temperature, as is known in the field. As the critical temperature is reached, the magnetic domain field strength of the magneto-optic data substrate 154 is reduced to close to zero. An external magnetic field is then applied to the magneto-optic data substrate 154 using the magnet 115 to change the domain to record a one or a zero.

Figure 7:
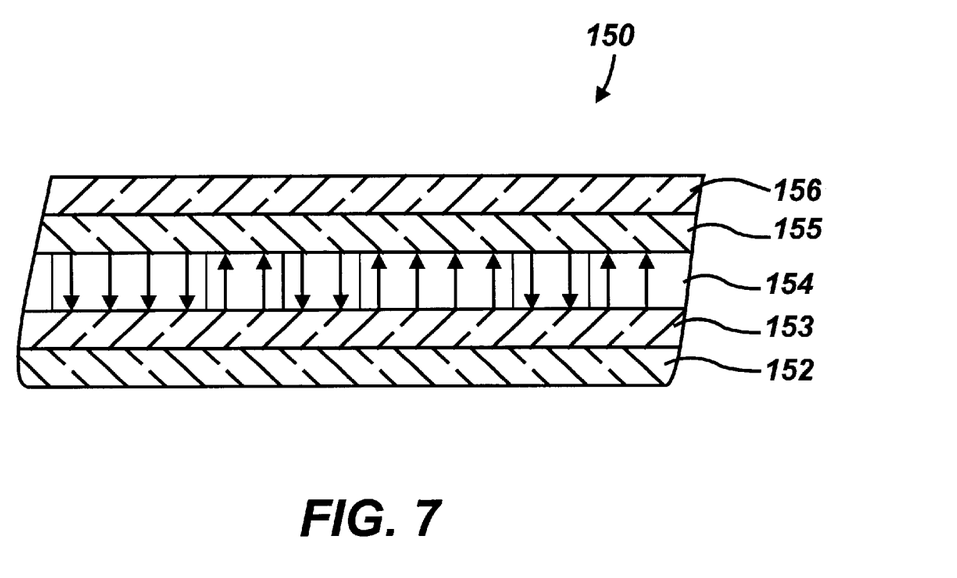
FIG. 7 is a partial cross-sectional view of a magneto-optic data storage medium according to the present invention, for use with the magneto-optic system of FIG. 6.

The arrows in the magneto-optic data substrate 154 are representative of an illustrative magnetic domain that corresponds to the data pattern of FIG. 3.

With reference to FIG. 7 the magneto-optic disk 150 is either fully or partially transmissive to the light beam 37. The magneto-optic disk 150 is formed of a plurality of generally transmissive superposed layers. The first layer is a substrate 152 which may be similar in composition to the substrate 40 of FIG. 1. A data magneto-optic data substrate 154 is formed or deposited on the substrate 152. In a preferred embodiment the data magneto-optic data substrate 154 is, or may be coated with one of the various writeable optical storage films such as WORM media, or one of the various erasable optical storage films such as phase change, or magneto-optical (WREM) media.

Any type of transmissive phase change films, substrates or rare earth transition metals may be used as the magneto-optic data substrate 154, or as part of the magneto-optic data substrate 154. In one embodiment two or more layers of different transmissive phase change films or substrates may be superposed to form the magneto-optic data substrate 154. The magneto-optic data substrate 154 may be vacuum deposited by known sputtering techniques, onto the substrate 152, to a thickness preferably ranging between 5 nm and 60 nm.

An optional light transmissive protective undercoat 153 may be deposited between the substrate 152 and the magneto-optic data substrate 154. This protective undercoat 153 may be for instance made of aluminum nitride (AlN) or any other suitable material. A light transmissive protective overcoat 155 may be formed on top of the magneto-optic data substrate 154. The overcoat 155 may have a similar composition to that of the undercoat 153, and is approximately 20 nm thick. Another transmissive protective layer 156 may optionally be formed on top of the overcoat 155. The protective layer 156 may be made of glass, plastic, or any other suitable polymer material.

Figure 8:
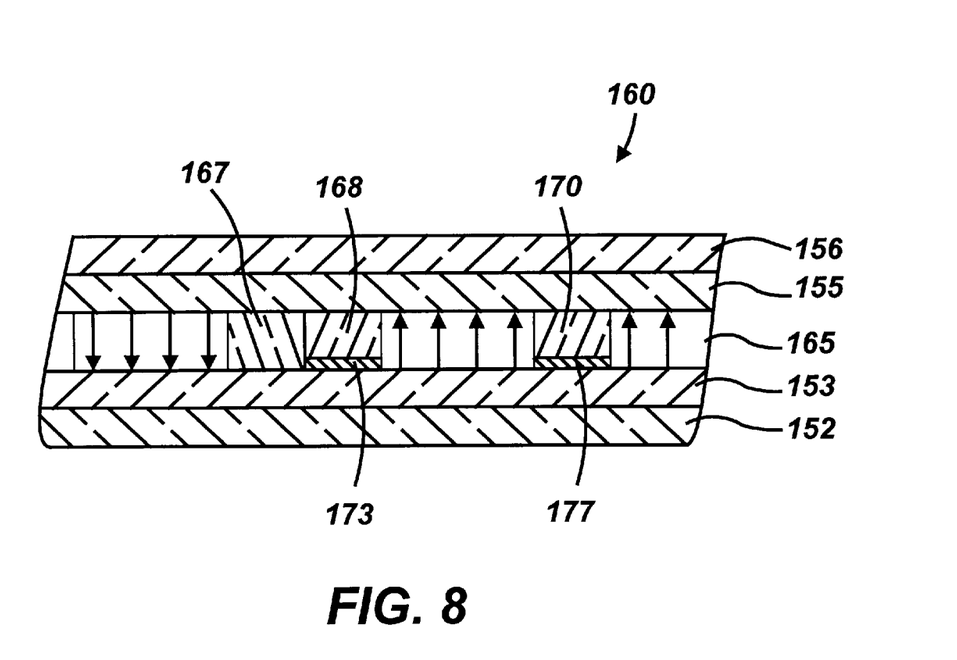
FIG. 8 is a partial cross-sectional view of a combination optical and magneto-optic data storage medium according to the present invention, for use with the optical system of FIG. 1 and the magneto-optic system of FIG. 6.

FIG. 8 illustrates yet another data storage medium or disk 160 which is a combination of the optical disk 12 and the magneto-optic disk 112, made according to the present invention. The disk 160 may be used with any of the optical systems, i.e., the optical system of FIG. 1 and the magneto-optic system of FIG. 6, described herein.

The disk 160 is similar to the magneto-optic disk 150 of FIG. 7 but utilizes a combination optical/magneto-optic data substrate 165 instead of the magneto-optic data substrate 154. Like the data substrate 42 of FIG. 2, the data substrate 165 includes a pattern of pass regions (i.e., 167) and block regions (i.e., 168, 170). As previously described in relation to the data substrate 42 of FIG. 2, the block regions 168, 170 include light reflective layers 173, 177, respectively. Similar to the data substrate 154 of FIG. 7, the data substrate 165 is formed of one or more magneto-optic layers for generating a magnetic domain illustrated by the arrows.

The data substrate 165 includes a combination of ROM, WORM, and/or WREM erasable media. In one design different types of materials are formed on designated tracks of the disk 160. As a result, the disk 160 may be used as ROM, WORM and/or WREM media.

It should be understood that the geometry, compositions, and dimensions described herein may be modified within the scope of the invention. For instance, the inventive concept of the present invention may be extended to optical and magneto-optic media with multiple data layers. Other modifications may be made when implementing the invention for a particular environment.

What is claimed is:

1. An optical data storage system for use with a data storage medium that is at least partly optically transmissive, the system comprising in combination:

a movable platform;

a head having a first optical arm and a second optical arm;

said first optical arm being secured to said platform and positioned below the storage medium;

said second optical arm being secured to said platform and positioned above the storage medium;

said first optical arm including:

a light source for generating a collimated light beam; and a first reflective surface connected to said first optical arm for reflecting said collimated light beam toward the storage medium and said second optical arm; and said second optical arm including:

a photo-detector; and a second reflective surface connected to said second optical arm for reflecting the light beam impinging upon it to said photo-detector;

said first reflective surface being positioned at an angle "α" relative to the storage medium; and said second reflective surface being positioned at an angle "β" relative to the storage medium, wherein said angles "α" and "β" are related so that the light beam is reflected toward said photo-detector; and wherein said angles "α" and "β" are substantially complementary.

2. The system according to claim 1, wherein said light source emits a laser beam substantially parallel to the storage medium.

3. The system according to claim 1, wherein said light beam passes through the storage medium for indicating the presence or absence of a digital data bit.

4. The system according to claim 1, wherein said light beam is blocked from passing through the storage medium for indicating the presence or absence of a digital data bit.

5. The system according to claim 1, wherein said light beam travels at a height ranging from about 0.2 mm to about 1.0 mm above the storage medium.

6. The system according to claim 1, wherein said first and second reflective surfaces are disposed substantially symmetrically relative to the storage medium.

7. The system according to claim 6, wherein each of said first and second reflective surfaces are positioned at an angle of approximately ±45 degrees relative to the storage medium.

8. The system according to claim 7, wherein said light beam travels normally through the storage medium when said light beam is allowed to pass through the storage medium.

9. The system according to claim 1, wherein said first and second optical arms move independently of each other.

10. An optical data storage system for use with a data storage medium that is at least partly optically transmissive, the system comprising in combination:

a platform;

a head having a first and a second optical arms;

said first optical arm being secured to said platform and positioned on one side of the storage medium;

said second optical arm being secured to said platform and positioned on another side of the storage medium;

said first optical arm including:
  a light source for generating a collimated light beam; and
  a first reflective surface distally positioned relative to said platform for reflecting said collimated light beam toward said storage medium and said second optical arm;

said second optical arm including:
  a photo-detector; and
  a second reflective surface distally positioned relative to said platform for reflecting the light beam impinging upon it to said photo-detector;

said first reflective surface being positioned at an angle "α" relative to the storage medium; and said second reflective surface being positioned at an angle "β" relative to the storage medium, wherein said angles "α" and "β" are related so that the light beam is reflected toward said photo-detector; and wherein said angles "α" and "β" are substantially complementary.

11. The system according to claim 1, wherein said platform moves substantially radially relative to the data storage medium.

12. The system according to claim 1, wherein said platform moves pivotally relative to the data storage medium.

13. The system according to claim 1, further including a magnet secured to said first reflective surface such that said light beam reflected by said first reflective surface passes through said magnet for recording data onto the storage medium.

14. The system according to claim 13, wherein said magnet is generally cylindrically shaped and hollow along its axial length.

15. The system according to claim 13, wherein said light source includes a reading laser source that emits a relatively weak light intensity, for reading data recorded onto the storage medium, and a recording laser source that emits a relatively high light intensity for recording data onto the storage medium.

16. The system according to claim 10, wherein said light source emits a laser beam substantially parallel to the storage medium.

17. The system according to claim 10, wherein said light beam passes through the storage medium for indicating the presence or absence of a digital data bit.

18. The system according to claim 10, wherein said light beam is blocked from passing through the storage medium for indicating the presence or absence of a digital data bit.

19. The system according to claim 10, wherein said first and second reflective surfaces are disposed substantially symmetrically relative to the storage medium.

20. The system according to claim 10, wherein said angles "α" and "β" are complementary.

21. The system according to claim 10, wherein said first and second optical arms move independently of each other.

22. The system according to claim 10, further including a magnetic coil secured to said first reflective surface such that said light beam reflected by said first reflective surface passes through said magnet for recording data onto the storage medium.

23. The system according to claim 22, wherein said magnetic coil is generally cylindrically shaped and hollow along its axial length.

24. The system according to claim 10, wherein said light source includes a reading laser source that emits a relatively weak light intensity, for reading data recorded onto the storage medium, and a recording laser source that emits a relatively high light intensity for recording data onto the storage medium.

25. An optical data storage system for use with a data storage medium that is at least partly optically transmissive, the system comprising in combination:

a movable platform;

a head having a first optical arm and a second optical arm;

said first optical arm being secured to said platform and positioned below the storage medium;

said second optical arm being secured to said platform and positioned above the storage medium;

said first optical arm including:
  a light source for generating a collimated light beam; and
  a first reflective mirror distally connected to said first optical arm for reflecting said collimated light beam toward the storage medium and said second optical arm; and said second optical arm including:
  a photo-detector; and
  a second reflective mirror distally connected to said second optical arm for reflecting the light beam impinging upon it to said photo-detector;

wherein said first mirror is positioned at an angle "α" relative to the storage medium; and wherein said second mirror is positioned at an angle "β" relative to the storage medium, such that said angles "α" and "β" are related by the following equation:

β=−(90°−α).

* * * * *